US010007957B2

(12) United States Patent
Canis et al.

(10) Patent No.: US 10,007,957 B2
(45) Date of Patent: Jun. 26, 2018

(54) SELECTING SEARCH RESULTS FOR RESPONDING TO SEARCH QUERY

(71) Applicant: Amadeus S.A.S., Biot (FR)

(72) Inventors: Laure Canis, Nice (FR); Feten Zmerli, Juan les Pins (FR)

(73) Assignee: AMADEUS S.A.S., Biot (FR)

(*) Notice: Subject to any disclaimer, the term of this patent is extended or adjusted under 35 U.S.C. 154(b) by 528 days.

(21) Appl. No.: 14/685,681

(22) Filed: Apr. 14, 2015

(65) Prior Publication Data

US 2016/0307281 A1 Oct. 20, 2016

(51) Int. Cl.
*G06Q 50/14* (2012.01)
*G06Q 10/02* (2012.01)
*G06Q 30/06* (2012.01)

(52) U.S. Cl.
CPC ........... *G06Q 50/14* (2013.01); *G06Q 10/025* (2013.01); *G06Q 30/0631* (2013.01)

(58) Field of Classification Search
None
See application file for complete search history.

(56) References Cited

U.S. PATENT DOCUMENTS 4,862,357 A * 8/1989 Ahlstrom ............... G06Q 10/02
705/6
2013/0290324 A1* 10/2013 Gibergues ......... G06F 17/30867
707/731

* cited by examiner

*Primary Examiner* — Paul Danneman
(74) *Attorney, Agent, or Firm* — Thompson Hine LLP

(57) ABSTRACT

Methods, apparatuses, and computer program products for processing search results. Search results are retrieved from a database of travel itineraries based on search criteria provided by a traveler, and a set of recommended travel itineraries selected from the search results based on a probabilistic profile comprising a plurality of value profiles. A set of near-optimal travel itineraries is defined for each of the value profiles. A probability is determined for each travel itinerary of the search results based on a sum of weights of each value profile including the travel itinerary in the corresponding set of near-optimal travel itineraries, and travel itineraries added to the set of recommended travel itineraries based on the probabilities. An online search may be performed to enrich the set of recommended travel itineraries depending on a distance between the probabilistic profile of the traveler and a probabilistic profile used to populate the cache.

22 Claims, 6 Drawing Sheets

SELECTING SEARCH RESULTS FOR RESPONDING TO SEARCH QUERY

BACKGROUND

The invention generally relates to computers and computer software, and in particular to methods, apparatuses, and computer program products for selecting search results for responding to a search query.

Reservation systems for travel related services, such as flights, typically include one or more databases that store data relating to the travel services being offered. These databases may include a fare database containing data used in determining a price of a service, and an availability database containing data used to determine if the service is available. Reservation systems may also provide tools that allow end-users, such as travelers and travel agents, to search for and book travel services that satisfy desired trip criteria. To this end, the tools provided may include one or more machine interfaces that enable other systems to access data from the databases. Systems provided access through these machine interfaces may include a Global Distribution System (GDS), as well as systems operated by travel agencies or other sellers of travel services.

To book a travel service, a traveler may access a travel-related website provided by the seller. As part of the booking process, the traveler may provide search criteria, such as an origin, destination, travel dates, booking class, etc., and launch a search query using the website. In response to receiving the search query, a search engine provided by one of the aforementioned systems may retrieve data from the databases and generate search results comprising travel itineraries that satisfy the search criteria. The speed and quality of the search results provided by the search engine can be a deciding factor that distinguishes one online seller, such as an online travel agent or agency, from another. Thus, travelers searching online for travel services, such as priced flights, hotels, or car rentals, may prefer one online seller over another based largely on both the quality of search results and the speed with which those results are provided.

Obtaining new search results each time a search query is received tends to be computationally intensive, and may increase the amount of time it takes to provide the search results to the traveler. Delays can be frustrating to the traveler, especially when the traveler is still in the process of shopping for travel services. To improve the speed with which search results can be determined, the search engine may use cached search results. Relying on cached search results may reduce the computational load on the reservation system, and improve perceived responsiveness of the search engine. However, conventional systems for using cached search results typically trade off speed verses quality based on how often the cache is updated from the fare and availability databases. Quality of cached search results may be particularly venerable to becoming stale in the travel industry due to rapid changes in availability, prices, and schedules. If either the quality or speed of search results is perceived as inadequate by the traveler, the traveler may seek out another online seller to search for and obtain travel services. How well a travel-related web site provides search results may thereby contribute to the amount of traffic and the number of purchases per view, or the "conversion rate" for the website.

Thus, improved methods, apparatuses, and computer program products for selecting cached search results are needed that improve both the speed and quality of search results provided in response to receiving a search query.

SUMMARY

In an embodiment of the invention, an apparatus for processing travel itineraries in a database is provided. The database includes a first set of travel itineraries that satisfy search criteria that is processed by the apparatus to generate a second set of recommended travel itineraries for a traveler. The apparatus includes one or more processors and a memory coupled to the one or more processors. The memory includes program code that, when executed by the one or more processors, causes the apparatus to, for each value profile of a plurality of value profiles, determine an adjusted value of each travel itinerary in the first set of travel itineraries using the value profile, and define a set of near-optimal travel itineraries from the first set of travel itineraries based on the adjusted value of each travel itinerary. The program code further causes the apparatus to, for each travel itinerary in the first set of travel itineraries, sum a weight of each value profile that includes the travel itinerary in the set of near-optimal travel itineraries of the value profile to generate a sum. The program code further causes the apparatus to compare the sums to determine the sum having a highest value, and add the travel itinerary having the sum with the highest value to the second set of travel itineraries.

In another embodiment of the invention, a method of processing the travel itineraries in the database is provided. The method includes, for each value profile of the plurality of value profiles, determining the adjusted value of each travel itinerary in the first set of travel itineraries using the value profile and defining the set of near-optimal travel itineraries from the first set of travel itineraries based on the adjusted value of each travel itinerary. The method further includes, for each travel itinerary in the first set of travel itineraries, summing the weight of each value profile that includes the travel itinerary in the first set of near-optimal travel itineraries of the value profile to generate the sum. The method further includes comparing the sums to determine the sum with a highest value, and adding the travel itinerary having the sum with the highest value to the second set of travel itineraries.

In another embodiment of the invention, a computer program product is provided that includes a non-transitory computer-readable storage medium including program code. The program code may be configured, when executed by the one or more processors, to cause the one or more processors to, for each value profile of the plurality of value profiles, determine the adjusted value of each travel itinerary in the first set of travel itineraries using the value profile, and define the set of near-optimal travel itineraries from the first set of travel itineraries based on the adjusted value of each travel itinerary. The program code further causes the one or more processors to, for each travel itinerary in the first set of travel itineraries, sum the weight of each value profile that includes the travel itinerary in the set of near-optimal travel itineraries of the value profile to generate the sum. The program code further causes the one or more processors to compare the sums to determine the sum having a highest value, and add the travel itinerary having the sum with the highest value to the second set of travel itineraries.

BRIEF DESCRIPTION OF THE DRAWINGS

The accompanying drawings, which are incorporated in and constitute a part of this specification, illustrate various embodiments of the invention, and, together with the general description of the invention given above, and the detailed description of the embodiments given below, serve to explain the embodiments of the invention.

DETAILED DESCRIPTION

Figure 1:
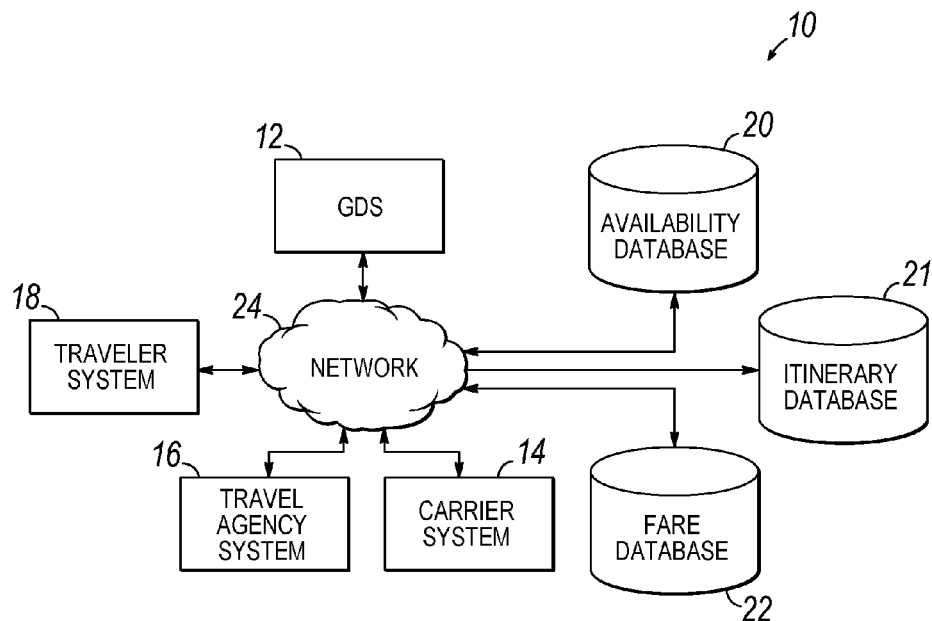
FIG. 1 is a diagrammatic view of an exemplary operating environment including a plurality of computer systems in communication via a network.

Embodiments of the invention may be implemented by a processing and database apparatus or system, such as a computerized reservation system. The processing and database system may be configured to respond to a travel search query by identifying travel itineraries that satisfy the search query, and returning the identified travel itineraries as search results. In the context of air travel, the processing and database system may be embodied in a Global Distribution System (GDS) that identifies travel itineraries including flights from multiple airlines. The GDS may also provide travel itineraries that include services such as train travel, hotel rooms, car rentals, sightseeing, and other travel-related activities or products.

The processing and database system may include a search engine that receives the search query, a recommendations database comprising a cache of previously determined search results, and a profile database including a plurality of probabilistic profiles. The search query may originate from a traveler who is accessing a website of an indirect seller of travel services, such as a travel agency, and may include data defining search criteria, such as an origin, destination, travel dates, booking class, etc. In response to receiving the search query, the search engine may determine which travel itineraries in the itinerary database match the search criteria, and return this set of travel itineraries to the search engine.

The search engine may then define a set of recommended travel itineraries from the set of travel itineraries satisfying the search criteria based on a probabilistic profile of the traveler. To this end, the probabilistic profile may be used to determine an "adjusted value" of each travel itinerary in the set of travel itineraries. This adjusted value may take into account both a monetary value (e.g., the price) of the travel itinerary as well as a convenience value of certain characteristics of the travel itinerary to the traveler, e.g., the value of a shorter flight time verses a longer flight. This convenience value may be determined using the probabilistic profile of the traveler. The set of recommended travel itineraries to be returned to the traveler may then be determined based on the adjusted value of each travel itinerary in the set of travel itineraries satisfying the search results.

The search engine may also determine whether the travel itineraries returned by the itinerary database are sufficiently relevant, or whether additional databases, such as fare, itinerary, and availability databases of the travel service providers, need to be accessed to enrich the search results. To this end, the probabilistic profile of the traveler may be compared to a probabilistic profile used to select the travel itineraries used to populate the cache to determine a distance between the probabilistic profiles. Depending on the distance, the search engine may return just search results obtained from the cache, or may query one or more external databases to obtain additional search results.

Referring now to FIG. 1, an operating environment 10 in accordance with an embodiment of the invention may include the GDS 12, one or more travel service provider systems, such as carrier system 14, one or more indirect seller systems, such as travel agency system 16, and a traveler system 18. The carrier system 14 may be in communication with one or more databases, such as an availability database 20, an itinerary database 21, and a fare database 22. Each of the GDS 12, carrier system 14, travel agency system 16, and traveler system 18 may communicate through a network 24. The network 24 may include one or more private or public networks (e.g., the Internet) that enable the exchange of data.

The GDS 12 may be configured to facilitate communication between the carrier system 14 and travel agency system 16 by enabling travel agents, validating carriers, or other indirect sellers to book reservations on the carrier system 14 via the GDS 12. The GDS 12 may maintain links to a plurality of carrier systems via the network 24 that enable the GDS 12 to route reservation requests from the validating carrier or travel agency to a corresponding operating carrier. The carrier system 14 and travel agency system 16 may thereby book flights on multiple airlines via a single connection to the GDS 12.

The carrier system 14 may include a Computer Reservation System (CRS) that enables the GDS 12 or travel agency system 16 to reserve and pay for airline tickets. To this end, the carrier system 14 may interact with the availability database 20, itinerary database 21, and fare database 22 to price and reserve travel services in response to booking requests or other queries from the GDS 12. The carrier system 14 may also interact with other carrier systems (not shown), either directly or through the GDS 12, to enable a validating carrier to sell tickets for seats provided by the operating carrier. The operating carrier may then bill the validating carrier for the services provided.

The travel agency system 16 may provide travel agents with an interface for accessing the GDS 12 that enables agents to search for and book travel itineraries. The travel agency system 16 may also include an application accessible by the traveler system 18 that enables the traveler to search for and book travel itineraries without the help of a travel agent. This application may comprise, for example, a travel-related website that is accessible over the network 24 using a web-browser provided by the traveler system 18.

The traveler system 18 may comprise a desktop computer, laptop computer, tablet computer, smart phone, or any other suitable computing device. The traveler may use the traveler system 18 to search for and book travel services by accessing the GDS 12, carrier system 14, travel agency system 16, or any other suitable system though the network 24. For example, the traveler may launch a browser application, and use the browser application to search for travel services on the website provided by the travel agency system 16, or a website provided by the GDS 12, carrier system 14, or any other suitable system. The traveler may book a selected travel service by entering payment information into the website.

Figure 2:
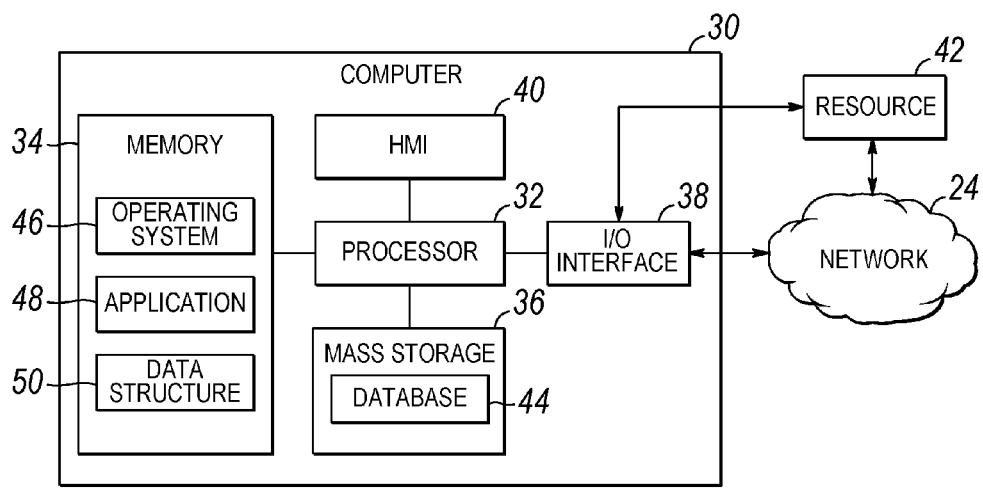
FIG. 2 is a diagrammatic view of an exemplary computer system of FIG. 1.

Referring now to FIG. 2, the GDS 12, carrier system 14, travel agency system 16, traveler system 18, availability database 20, itinerary database 21, and fare database 22 of operating environment 10 may be implemented on one or more computer devices or systems, such as exemplary computer system 30. The computer system 30 may include a processor 32, a memory 34, a mass storage memory device 36, an input/output (I/O) interface 38, and a Human Machine Interface (HMI) 40. The computer system 30 may also be operatively coupled to one or more external resources 42 via the network 24 or I/O interface 38. External resources may include, but are not limited to, servers, databases, mass storage devices, peripheral devices, cloud-based network services, or any other suitable computer resource that may be used by the computer system 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 32 may operate under the control of an operating system 46 that resides in memory 34. The operating system 46 may manage computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, or application 48 to store or manipulate data.

The I/O interface 38 may provide a machine interface that operatively couples the processor 32 to other devices and systems, such as the network 24 or external resource 42. The application 48 may thereby work cooperatively with the network 24 or external resource 42 by communicating via the I/O interface 38 to provide the various features, functions, applications, processes, or modules comprising embodiments of the invention. The application 48 may also have program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 24, such as a cloud computing service.

The HMI 40 may be operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 may also include input devices and controls such as an alphanumeric keyboard, a pointing device, keypads, push-buttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

Figure 3:
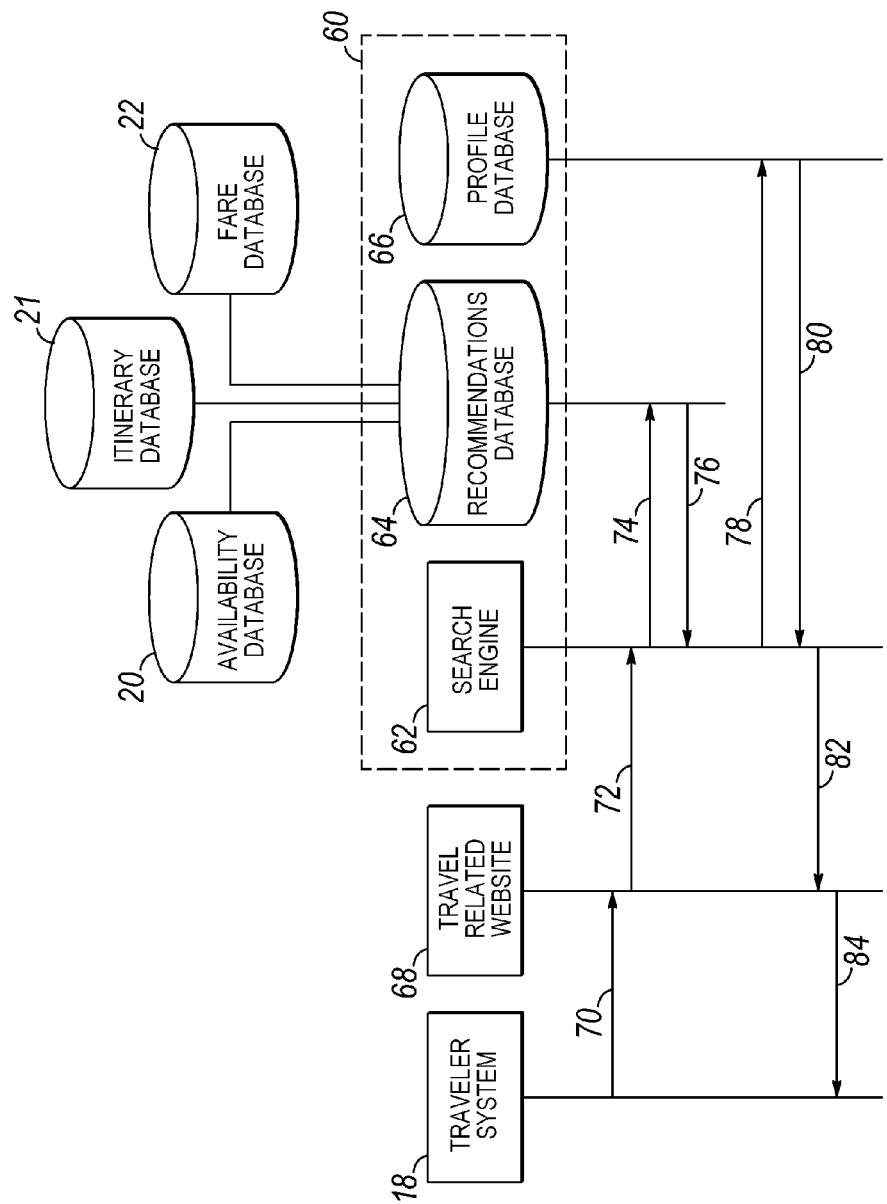
FIG. 3 is a diagrammatic view of a computer system including a search engine, a recommendations database, and a profile database.

Referring now to FIG. 3, in an exemplary embodiment of the invention, a computer system 60 may provide a search engine 62, a recommendations database 64 including cached search results, and a profile database 66 including traveler profiles. The computer system 60 may be in communication with the carrier system 14 and a travel-related website 68. In an embodiment of the invention, the computer system 60 may be provided by the GDS 12, and the travel-related website 68 may be provided by the travel agency system 16. However, a person having ordinary skill in the art would understand that computer system 60 and travel-related website 68 could be provided by any suitable computer system.

The traveler may access one or more web-pages provided by the travel-related website 68 using the traveler system 18. The traveler may interact with the web-pages to search for and book travel itineraries. These travel itineraries may comprise one or more travel services, such as flights, hotel rooms, car rentals, products to be provided to the traveler, or any other travel service. To this end, the traveler system 18 may transmit a search query 70 to the travel-related website 68. The search query 70 may include data defining search criteria, such as an origin and destination, travel dates, booking classs or cabin type, and number and type of passengers. In response to receiving the search query 70, the travel-related website 68 may transmit a search query 72 including data defining search criteria to the search engine 62. The travel-related web site 68 may also transmit data defining a user profile to the search engine 62.

In response to receiving the search query 72, the search engine 62 may generate and transmit a database search query 74 to the recommendations database 64. In response to receiving the database search query 74, the recommendations database 64 may identify one or more travel itineraries in the cached search results that satisfy the search criteria. To update or add to the cached search results, the recommendations database 64 may periodically query the carrier system 14 for travel itineraries matching pre-determined search criteria. The pre-determined search criteria may be based on search criteria expected to be received from travelers. The carrier system 14 may in turn query one or more of the availability database 20, itinerary database 21, and fare database 22 to determine travel itineraries that match the predetermined search criteria, and return these travel itineraries to the recommendations database 64 as search results. The recommendations database 64 may then cache these pre-determined search results for later use in responding to queries received from the traveler.

In an embodiment of the invention, the search results received from the carrier system 14 may be filtered or otherwise processed by the recommendations database 64 based on a statistical probabilistic profile. The statistical probabilistic profile may be used to determine the adjusted value of the travel itinerary that captures both the price of the travel products and the convenience value added or subtracted by specific features or characteristics of the travel itinerary. The recommendations database 64 may then select travel itineraries to add to the cache based on the adjusted value.

In response to identifying the travel itineraries in the cache that match the search criteria, the recommendations database 64 may transmit a response 76 to the search engine 62. The response 76 may include search results comprising the identified travel itineraries. While the recommendations database 64 is compiling the search results, or in response to receiving the response 76, the search engine 62 may transmit a query 78 to the profile database 66 that includes data defining the traveler identity. The query 78 may request the profile database 66 provide a probabilistic profile for the traveler. If the probabilistic profile exists for the traveler, the profile database 66 may transmit the probabilistic profile to the search engine 62 in a response 80. If the traveler does not have a pre-existing probabilistic profile, the profile database 66 may transmit a default probabilistic profile to the search engine 62, or the response 80 may indicate that a probabilistic profile does not exist for the identified traveler. In the latter case, the search engine 62 may generate a default probabilistic profile for the traveler.

Each probabilistic profile in the profile database 66 may be associated with a composite profile comprising a set of coefficients, with each coefficient corresponding to a characteristic of the travel itinerary. The value of each coefficient may indicate how important the corresponding characteristic of the travel itinerary is to the traveler. For example, one of the coefficients may correspond to the total travel time of the itinerary. To provide an indication of how important this characteristic is to the traveler in relation to the monetary value, or price $C_M$ of the travel products comprising the travel itinerary, the value assigned to the coefficient may have a monetary value (e.g., $20/hour of travel time).

The composite profile may be used to determine the adjusted value of the travel itinerary for the traveler in question. The adjusted value may capture both the price $C_M$ of the travel products and the convenience value $C_{CV}$ added or subtracted for the traveler by specific features or characteristics of the travel itinerary. Using the above exemplary coefficient of $20/hour to characterize the cost of travel time, a travel itinerary having a total travel time of 4 hours may have a $C_{CV}$=$80 added to the price $C_M$ of the travel itinerary to reflect the adjusted value $C_{ADJ}$=$C_M$+$C_{CV}$ to the traveler in question. In contrast, a trip itinerary connecting the same origin and destination, but having a total travel time of 8 hours, may have a $C_{CV}$=$160 added to the price $C_M$ of the travel itinerary. Thus, in the above example, the price $C_M$ of travel itinerary having the 4 hour travel time would have to be more than $80 greater than the price $C_M$ of the travel itinerary having the 8 hour travel time in order to have a higher adjusted value $C_{ADJ}$ to the traveler, assuming all other features of the travel itineraries are the same. The composite profile may thereby provide a means of determining an overall desirability of the travel itinerary to the traveler in question that captures both the price of the travel products comprising the itinerary and the impact of convenience factors (or inconvenience factors, as the case may be) on the traveler.

Once the composite profile is known, the search engine 62 may apply the composite profile to determine the adjusted value $C_{ADJ}$ for each of the search results in response 80. The search engine 62 may then rank the search results based on their adjusted value $C_{ADJ}$, with search results having a lower adjusted value $C_{ADJ}$ being given a higher rank. The search engine 62 may then transmit a response 82 to the travel-related website 68 that includes at least a portion of the ranked search results selected based on rank. For example, the selected search results may comprise a predetermined number of search results representing the highest ranking search results. In response to receiving the response 82, the travel-related website 68 may format the results and transmit a response 84 to the search query 70 that includes the search results selected by the search engine 62 for display to the traveler. The response 84 may comprise data that causes the browser application running on the traveler system 18 to display a window populated with the selected search results, for example.

Figure 4:
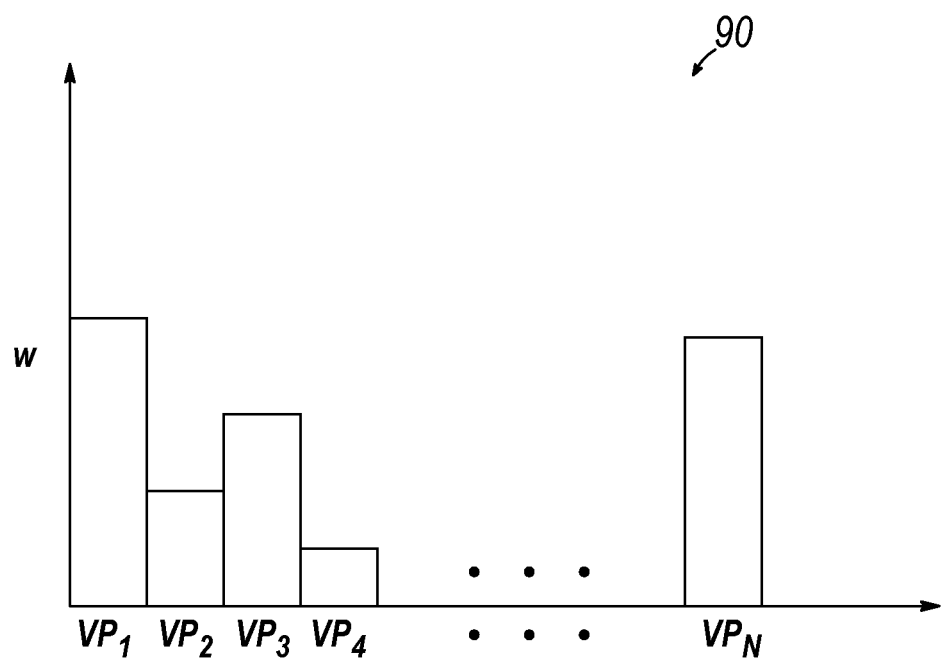
FIG. 4 is a diagrammatic view of a probabilistic profile used by the search engine in FIG. 3.

FIG. 4 depicts a diagrammatic view of a probabilistic profile 90 comprising an array of N value profiles $VP_1$-$VP_N$. Each value profile $VP_1$-$VP_N$ of the probabilistic profile 90 may comprise a probability, or weight $w_1$-$w_N$, (represented by the height of each value profile $VP_1$-$VP_N$ along the vertical axis). That is, the probabilistic profile 90 may be represented by an array $[w_1 \times VP_1, w_2 \times VP_2, \ldots w_N \times VP_N]$. Each value profile $VP_1$-$VP_N$ of the probabilistic profile 90 may further comprise a set of M travel itinerary characteristics $(v_1, v_2, \ldots v_M)$. The weight $w_1$-$w_N$ may provide the relative effect of the corresponding value profile $VP_1$-$VP_N$ in a blending function that provides the composite profile of the traveler. To this end, the weight $w_1$-$w_N$ of each value profile $VP_1$-$VP_N$ may be determined based on how well the corresponding value profile $VP_1$-$VP_N$ identifies travel itineraries having the lowest adjusted value $C_{ADJ}$ for the traveler in question from a subset of travel itineraries. That is, the weight $w_i$ may provide a probability that the corresponding value profile $VP_i$ will accurately compute the adjusted value $C_{ADJ}$ of a travel itinerary for the traveler.

Each coefficient $v_1$-$v_M$ of the value profile $VP_i$ may describe a value of a corresponding travel itinerary characteristic. By way of example, the coefficients $v_1$-$v_M$ may include coefficients corresponding to the cost/hour for travel time (e.g., add $20 for each hour of travel time), a cost/stop for each stop or connection required (e.g., add $30 for each stopover), a cost/stop for each stop having an overnight stopover requirement (e.g., add $100 for an overnight stopover), a cost associated with an undesirable carrier (e.g., add $40 if carrier is Acme Air), a cost associated with an undesirable type of carrier (e.g., add $50 if carrier is a low-cost carrier), a cost associated with a particular air carrier policy (e.g., add $40 if carrier only allows one carry-on bag or has a record of excessive delays), or an additional cost if departure is outside a preferred travel time (e.g., add $30 for flights departing prior to 8 AM), to name just a few.

Taking into account all possible levels of willingness to pay for all criteria may result in a number of value profiles N that would be impractical to manage. In an embodiment of the invention, to keep the number of value profiles to a manageable level, the values of each coefficient may be quantized into discrete values. To this end, the costs associated with each coefficient may be quantized to values having fixed increments (e.g., $10) over a pre-determined range (e.g., $0 to $100). By way of example, a value profile consisting of coefficients corresponding to a cost/hour for travel time mapped to a set of values with $10 increments over the range of $0 to $50, and a cost/stop for overnight stopovers, a cost penalty for selecting a carrier that is categorized as undesirable, a cost for an undesirable type of carrier, and a cost for an undesirable time of departure each mapped to a set of values with $10 increments over the range of $0 to $100 would result in $N=6\times 11^4=87,846$ value profiles.

The probabilistic profile may be used to drive the search for travel itineraries, and the highest ranking search results selected from the search results output by the search. The probabilistic profile may also be used to select the most relevant recommendations from the output of a non-personalized search for travel itineraries matching the travelers search terms. In either case, the composite profile for the traveler may be constructed from one or more of the value profiles $VP_1$-$VP_N$. For example, the composite profile, or CP for the traveler may be determined by taking a sum of the weighted value profiles $VP_1$-$VP_N$ as follows:

$$CP = \sum_{i=1}^{N} w_i \times VP_i$$

where the weights $w_1$-$w_N$ are normalized so that:

$$\sum_{i=1}^{N} w_i = 1$$

The resulting composite profile may provide the set of M travel itinerary characteristics $(v_1, v_2, \ldots v_M)$ for the traveler in which each itinerary characteristic $(v_1, v_2, \ldots v_M)$ of the composite profile comprises the weighted sum of the corresponding itinerary characteristics $(v_1, v_2, \ldots v_M)$ of each of the value profiles $VP_1$-$VP_N$.

Figure 5:
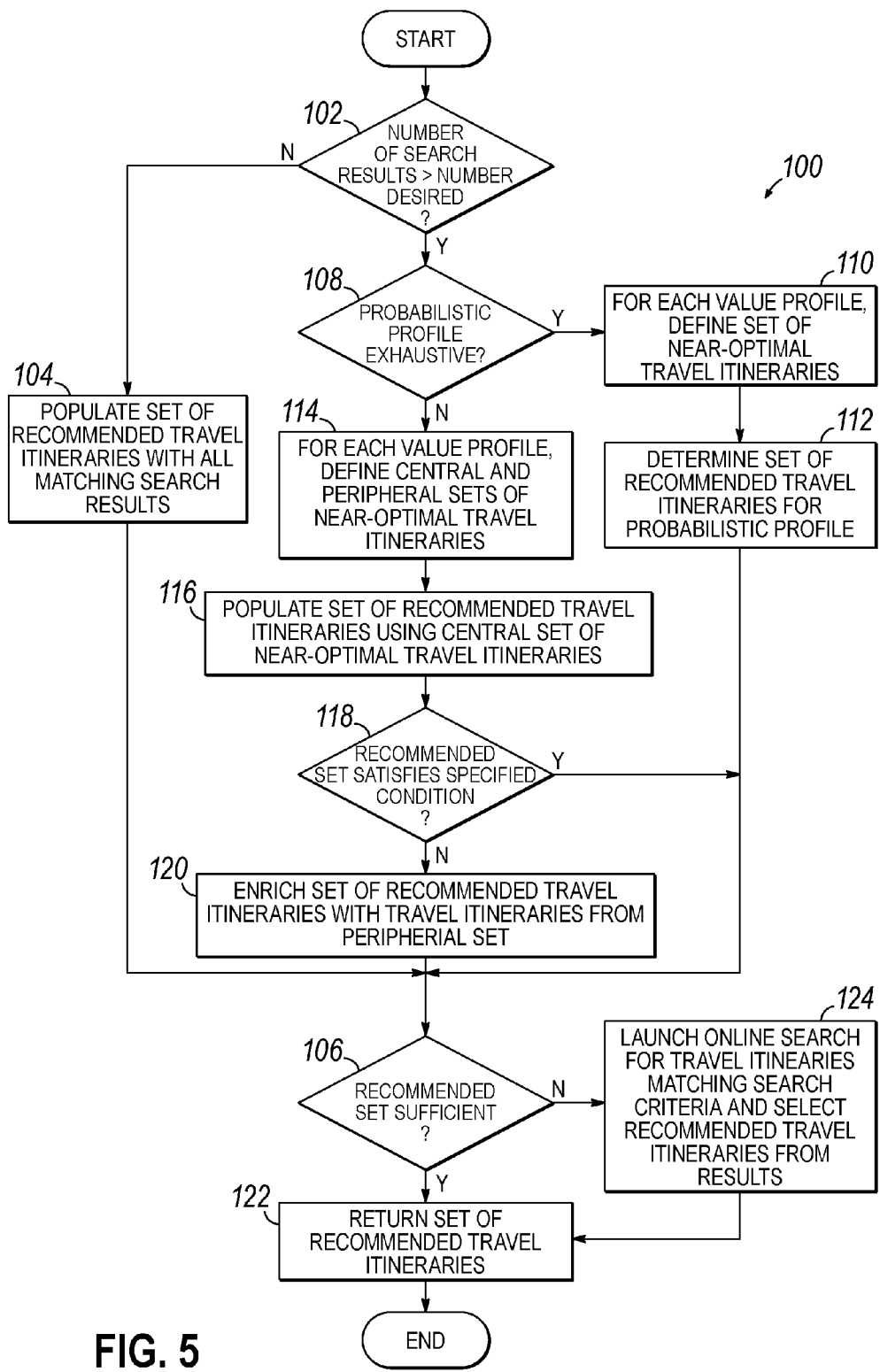
FIG. 5 is a flow chart illustrating a process that may be executed by the computer system of FIG. 3 to select search results for a set of recommended travel recommendations to include in a reply to a search query from a traveler.

Referring now to FIG. 5, a flow chart depicts a process 100 that may be performed by the search engine 62 to determine the travel itineraries to return in response to receiving the search query 72 from the traveler. The process 100 may determine which travel itineraries from the cached search results in the recommendations database 64 to include in the response 82 based on the probabilistic profile of the traveler. For each set of search criteria used to obtain the pre-determined search results, there may a number of travel itineraries $M_R$ stored in the recommendations database 64. The travel itineraries stored in the recommendations database 64 may be indexed by origination and destination, date of travel, passenger type code, and an identity of the customer (e.g., the third party seller). The convenience factors and prices corresponding to each travel recommendation may also be stored and indexed in the recommendations database 64. More than one price may be stored and indexed for each travel itinerary, e.g., a different price for each combination of classes under which a seat may be booked.

The customer may provide business rules prescribing that the search engine 62 return $N_R$ recommended travel itineraries in response to receiving the search query 72. $N_R$ may represent threshold number of travel itineraries that are to be provided as search results in response 82. These business rules may also select the number $N_R$ to define how the results are displayed, such as display an exhaustive list (e.g., all $M_R$ results) with some featured results (e.g., $N_R$ results) positioned at the top of the search results, to display only $N_R$ results, or at most $N_R$ results.

In block 102, the process 100 may determine if the number $M_R$ of travel itineraries in the recommendations database 64 matching the search criteria exceeds the number $N_R$ of travel itineraries to be returned to the traveler. If the number $M_R$ is not greater than the number $N_R$ ("NO" branch of decision block 102), the process 100 may proceed to block 104 and return all $M_R$ matching travel itineraries as the search results before proceeding to block 106. If the number $M_R$ is greater than the number $N_R$ ("YES" branch of decision block 102), the process 100 may proceed to block 108.

In block 108, the process 100 may determine if the probabilistic profile of the traveler is exhaustive. The probabilistic profile may be considered exhaustive if the probabilistic profile includes all possible value profiles. That is, the probabilistic profile includes a value profile corresponding to each possible combination of the quantized itinerary characteristic values $(v_1, v_2, \ldots v_M)$.

If the probabilistic profile is exhaustive ("YES" branch of decision block 108), the process 100 may proceed to block 110. The traveler may be satisfied with a recommended travel itinerary if the travel itinerary is sufficiently close in adjusted value $C_{ADJ}$ to an "optimal" travel itinerary. That is, if the recommended travel itinerary is a "near-optimal" travel itinerary. An optimal travel itinerary may be determined for each value profile by determining the adjusted value $C_{ADJ}$ of each travel itinerary matching the search criteria using the value profile $VP_i$, and selecting the travel itinerary having the lowest adjusted value $C_{ADJ}$. The optimal travel itinerary for the traveler may be the optimal travel itinerary of the value profile $VP_i$ most closely corresponding to the personal preferences of the traveler. For an exhaustive probabilistic profile, a travel itinerary that is optimal for one value profile $VP_i$ may be near-optimal for several other value profiles $VP_i$. Thus, near-optimal travel itineraries corresponding to the value profiles $VP_i$ with the largest weights may provide near-optimal travel itineraries to a large percentage of travelers.

In block 110, the process 100 may, for each value profile $VP_i$ in the probabilistic profile, compute the adjusted value $C_{ADJ}$ of each of the $M_R$ travel itineraries matching the search results. The process 100 may then identify the optimal travel itinerary, and define a set of near-optimal travel itineraries comprising the optimal travel itinerary and the travel itineraries having an adjusted value $C_{ADJ}$ within a near-optimal threshold (e.g., 5%). In response to defining the set of near-optimal travel itineraries, the process 100 may proceed to block 112.

Figure 6:
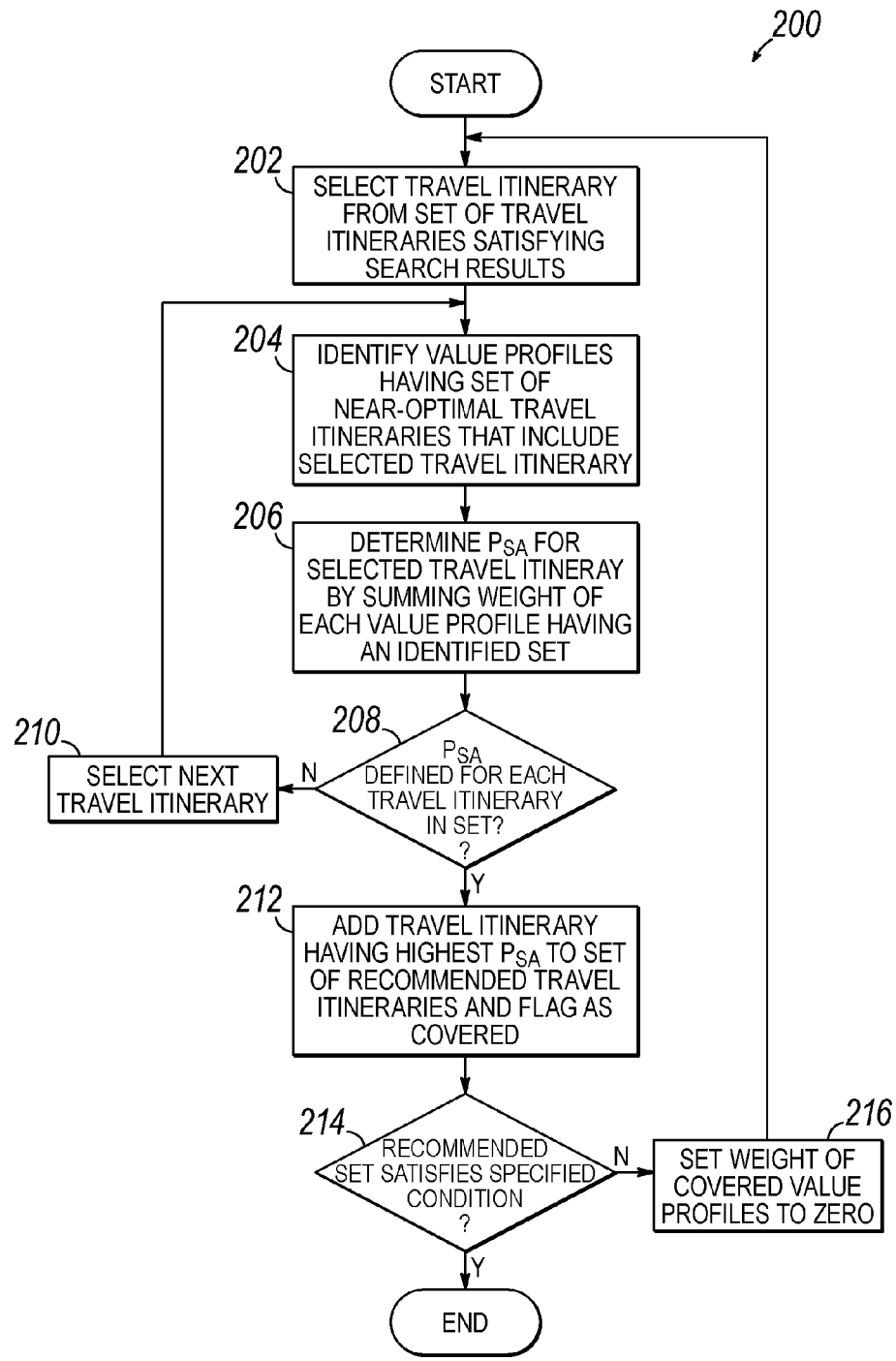
FIG. 6 is a flow chart illustrating a process that may be executed by the computer system of FIG. 3 to select travel itineraries to add to the set of recommended travel itineraries.

Referring now to FIG. 6 and with continued reference to FIG. 5, in block 112, the process 100 may execute a sub-process 200 that selects travel itineraries to include in a set of travel itineraries to be recommended to the traveler, i.e., a set of recommended travel itineraries. To this end, the sub-process 200 may, for each travel itinerary satisfying the search criteria, determine a probability $P_{SA}$ that the travel itinerary will satisfy the traveler. The sub-process 200 may begin in block 202 by selecting a travel itinerary from the set of travel itineraries satisfying the search criteria.

The sub-process 200 may proceed to block 204 and identify each value profile $VP_i$ in the probabilistic profile of the traveler having a set of near-optimal travel itineraries that includes the travel itinerary selected in block 202. The sub-process 200 may then proceed to block 206 and determine $P_{SA}$ by summing the normalized weights $w_i$ of each value profile $VP_i$ identified in block 204. $P_{SA}$ may thereby provide a probability that the travel itinerary selected in block 202 is a near-optimal travel itinerary for the traveler.

Proceeding to block 208, the sub-process 200 may determine if $P_{SA}$ has been determined for each travel itinerary in the set of travel itineraries satisfying the search results. If $P_{SA}$ has not been determined for each travel itinerary in the set of travel itineraries satisfying the search results ("NO" branch of decision block 208), the sub-process 200 may proceed to block 210. In block 210, the sub-process 200 may select another travel itinerary from the set of travel itineraries satisfying the search results for which $P_{SA}$ has yet to be determined and return to block 204.

If $P_{SA}$ has been determined for each travel itinerary in the set of travel itineraries satisfying the search results ("YES" branch of decision block 208), the sub-process 200 may proceed to block 212. In block 212, the sub-process 200 may identify the travel itinerary having the highest value of $P_{SA}$ and add this travel itinerary to the set of recommended travel itineraries. The sub-process 200 may then proceed to block 214 and determine if the set of recommended travel itineraries satisfies a specified condition. In an embodiment of the invention, the specified condition for block 214 of process 200 may be that the set of recommended travel itineraries has reached a threshold amount, e.g., includes $N_R$ travel itineraries.

If the set of recommended travel itineraries satisfies the specified condition, e.g., the set of recommended travel itineraries includes at least $N_R$ travel itineraries ("YES" branch of decision block 214), the sub-process 200 may end, and process 100 proceed to block 106. If the set of recommended travel itineraries does not satisfy the specified condition, e.g., the set of recommended travel itineraries includes less than $N_R$ travel itineraries ("NO" branch of decision block 214), the sub-process 200 may proceed to block 216. In block 216, the sub-process 200 may set the weight $w_i$ of each value profile that includes a travel itinerary from the recommended set in its near-optimal set (referred to herein as "covered" value profiles) to a predetermined value, e.g., zero.

By setting the weights $w_i$ of covered value profiles to the predetermined value, the sub-process 200 may reduce or prevent the covered value profiles, which already have at least one near-optimal travel itinerary in the set of recommended travel itineraries, from contributing to $P_{SA}$ in subsequent rounds of the selection process. The sub-process 200 may then return to block 202 to begin selecting the next travel itinerary to add to the set of recommended travel itineraries.

If the probabilistic profile is not exhaustive ("NO" branch of decision block 108), the process 100 may proceed to block 114. In block 114, the process 100 may define a central set of near-optimal travel itineraries, and a peripheral set of near-optimal travel itineraries. To this end, and as described above with respect to block 108, the process 100 may, for each value profile $VP_i$ in the probabilistic profile, compute the adjusted value of each of the $M_R$ travel itineraries matching the search results, and identify the optimal travel itinerary. The process 100 may then define the central set of near-optimal travel itineraries as comprising the optimal travel itinerary and the travel itineraries having an adjusted value $C_{ADJ}$ within one near-optimal threshold (e.g., 5%). The process 100 may further define the peripheral set of near-optimal travel itineraries as comprising the optimal travel itinerary and the travel itineraries having an adjusted value $C_{ADJ}$ within another near-optimal threshold different from the one threshold (e.g., 20%).

Because the non-exhaustive probabilistic profile may not include all possible value profiles, there may be specific value profiles $VP_i$ that are not represented in the probabilistic profile. For example, value profiles $VP_i$ including traveler time preferences may be excluded to reduce the number of value profiles $VP_i$ in the probabilistic profile. To compensate for missing value profiles $VP_i$, and to increase the probability of returning acceptable search results to the traveler, the process 100 may add multiple near-optimal travel itineraries to the set of recommended travel itineraries for each value profile $VP_i$ in the non-exhaustive probabilistic profile. A threshold number of near-optimal travel itineraries $N_T$ for each value profile may be set to a specific value (e.g., four), or may vary between different value profiles $VP_i$ based on an importance of the value profile $VP_i$. The objective of the process 100 may be to maximize a probability $P_{SB}$, which may be provided by:

$$P_{SB} = \sum_{i=0}^{N} w_i \times F(N_{NOi})$$

where $N_{NOi}$ is the number of near-optimal travel itineraries for the corresponding value profile in the recommended set, and $F(N_{NOi})$ is a function that returns a logical value one (true) if $N_{NOi}$ is equal to or greater than a threshold and a logical value zero (false) otherwise.

Adding an additional near-optimal travel itinerary to the set of recommended travel itineraries that is similar to an existing travel itinerary in the set may fail to improve coverage significantly. One near-optimal travel itinerary may be considered as similar to another if one of the characteristics of the travel itineraries is the same. For example, two near-optimal travel itineraries having the same departure times may be considered to be similar.

To address the above issue with similar near-optimal travel itineraries, in an embodiment of the invention, the number of near-optimal travel itineraries $N_{NOi}$ may only count near-optimal travel itineraries that are not similar to other near-optimal travel itineraries in the set of recommended travel itineraries. That is, if the set of recommended travel itineraries includes a plurality of similar travel itineraries, the plurality may only count as one travel itinerary for the purposes of determining $N_{NOi}$. That is, $N_{NOi}$ may only count the number of dissimilar near-optimal travel itineraries in the set of recommended travel itineraries. Dissimilar near-optimal travel itineraries may be travel itineraries that are in the same near-optimal set, but that are sufficiently different from each other so as to contribute to the diversity of the set of recommended travel itineraries. For example, two near-optimal travel itineraries having different departure times may be considered dissimilar.

In response to defining the central set and peripheral set of near-optimal travel itineraries, the process 100 may proceed to block 116. In block 116, the process 100 may set the specified condition for sub-process 200. The process 100 may then populate the set of recommended travel itineraries from the central set of near-optimal travel itineraries using sub-process 200 until the specified condition is met as described above with respect to FIG. 6. In an embodiment of the invention, the specified condition set in block 116 may be that the set of recommended travel itineraries includes at least one travel itinerary from each central set of near-optimal travel itineraries of value profiles encompassing a specified percentage of travelers. For example, the specified percentage of travelers may be 90% of the travelers in the profile database 66. In another embodiment of the invention, the specified condition may be that either the number of travel itineraries in the preliminary set of travel itineraries has reached the threshold number $N_T$, or the travel itineraries in the preliminary set of travel itineraries encompass the specified percentage of travelers. In any case, in response to the specified condition for sub-process 200 being satisfied, the process 100 may exit the sub-process 200 and proceed to block 118.

In block 118, the process 100 may determine if the set of recommended travel itineraries meets another specified condition. For example, the condition specified in decision block 118 may be that the set of recommended travel itineraries includes $N_R$ travel itineraries. If the set of recommended travel itineraries meets the specified condition ("YES" branch of decision block 118), the process 100 may proceed to block 106. If the set of recommended travel itineraries does not meet the specified condition ("NO" branch of decision block 118), the process 100 may proceed to block 120.

Figure 7:
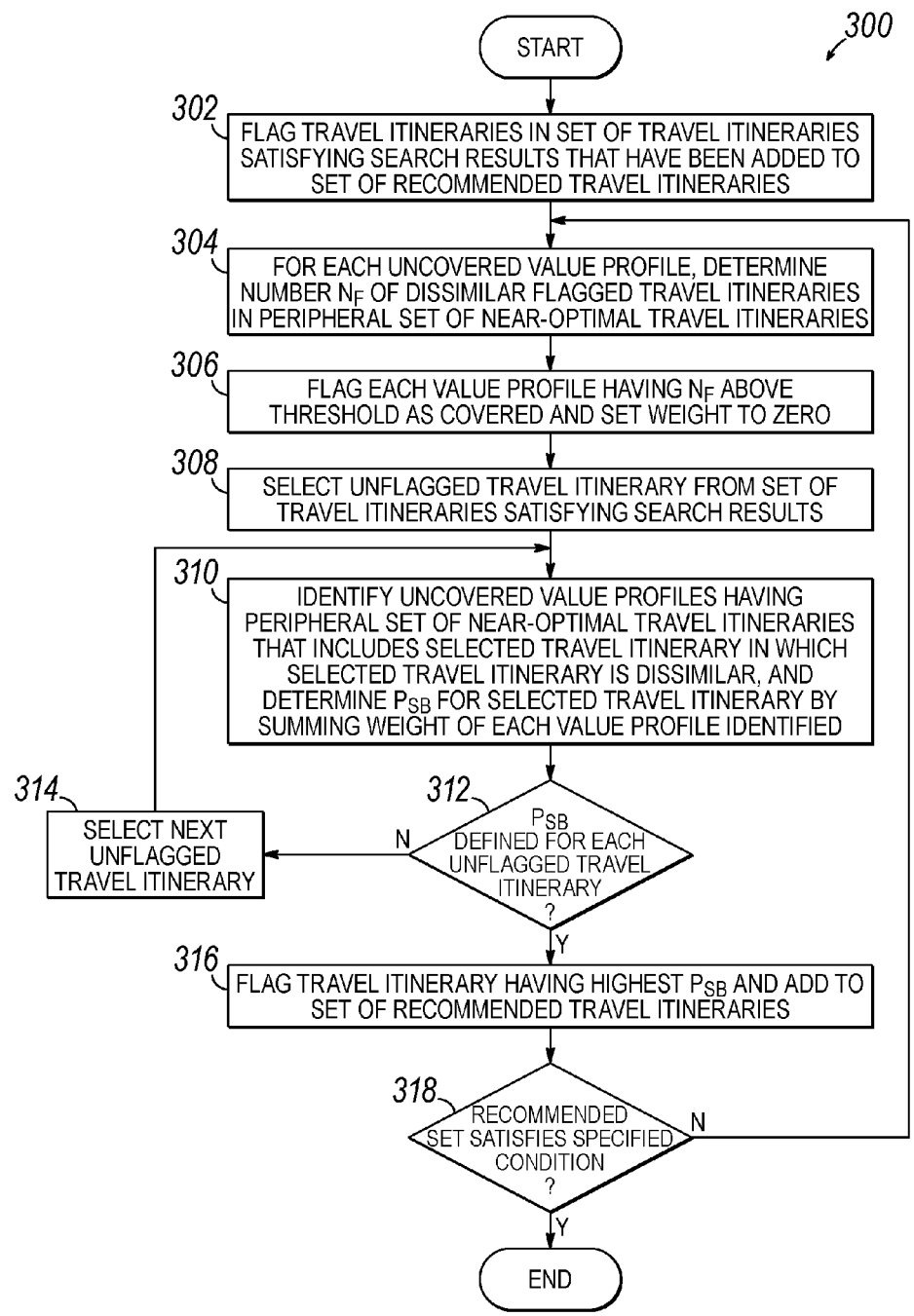
FIG. 7 is a flow chart illustrating another process that may be executed by the computer system of FIG. 3 to select travel itineraries to add to the set of recommended travel itineraries.

Referring now to FIG. 7, a flow chart depicts a sub-process 300 that may be executed by process 100 in block 120 to enrich the set of recommended travel itineraries with travel itineraries using the peripheral sets of near-optimal travel itineraries. In block 302, the sub-process 300 may flag or otherwise identify the travel itineraries in the set of travel itineraries satisfying the search criteria that have been added to the set of recommended travel itineraries. Flagging the travel itineraries may enable the sub-process 300 to determine whether or not a travel itinerary in the set of set of travel itineraries satisfying the search criteria has been added to the set of recommended travel itineraries. In response to flagging the travel itineraries, the sub-process 300 may proceed to block 304.

In block 304, sub-process 300 may determine, for each uncovered value profile $VP_i$ in the probabilistic profile of the traveler, a number $N_{Fi}$ of flagged travel itineraries that are in the corresponding peripheral set of near-optimal travel itineraries. In an embodiment of the invention, the number of flagged travel itineraries $N_{Fi}$ may only include dissimilar travel itineraries. That is, a group of similar travel itineraries may only count as one travel itinerary for the purposes of determining the number of flagged travel itineraries $N_{Fi}$ in the peripheral set of near-optimal travel itineraries. In response to determining the number of flagged travel itineraries $N_{Fi}$ in the peripheral set of near-optimal travel itineraries for each value profile $VP_i$, the sub-process 300 may proceed to block 306.

In block 306, the sub-process 300 may flag or otherwise identify each value profile $VP_i$ having an $N_{Fi}$ equal to or greater than the threshold number $N_T$ as being covered. The sub-process 300 may also set the weight of the covered value profiles to a reduced value, e.g., zero. The sub-process 300 may then proceed to block 308. In block 308, the sub-process 300 may select an unflagged travel itinerary from the set of travel itineraries satisfying the search criteria and proceed to block 310.

In block 310, the sub-process 300 may identify each uncovered value profile $VP_i$ of the probabilistic profile that has a peripheral set of near-optimal travel itineraries which includes the unflagged travel itinerary selected in block 308. The sub-process 300 may then determine, for each uncovered value profile $VP_i$ identified, if the unflagged travel itinerary is dissimilar to each of the other travel itineraries in the corresponding peripheral set of near-optimal travel itineraries. The sub-process 300 may then determine the probability $P_{SB}$ by summing the weights of each uncovered value profile having the dissimilar unflagged travel itinerary.

In response to determining $P_{SB}$, the sub-process 300 may proceed to block 312 and determine if $P_{SB}$ has been determined for each unflagged travel itinerary. If $P_{SB}$ has not been determined for each unflagged travel itinerary ("NO" branch of decision block 312), the sub-process 300 may proceed to block 314 and select the next unflagged travel itinerary before returning to block 310. If $P_{SB}$ has been defined for each unflagged travel itinerary ("YES" branch of decision block 312), the sub-process 300 may proceed to block 316.

In block 316, the sub-process 300 may determine the travel itinerary having the highest value of $P_{SB}$, and add this travel itinerary to the set of recommended travel itineraries. The sub-process 300 may also flag or otherwise identify the travel itinerary to indicate that it has been added to the set of recommended travel itineraries. The sub-process 300 may then proceed to block 318 and determine if the set of recommended travel itineraries meets a specified condition, e.g., the set contains at least $N_R$ travel itineraries. If the set of recommended travel itineraries does not meet the specified condition ("NO" branch of decision block 318), the sub-process 300 may return to block 304 and begin the process of identifying another travel itinerary to add to the set of recommended travel itineraries. If the set of recommended travel itineraries satisfies the specified condition ("YES" branch of decision block 318), process 100 may exit sub-process 300 and proceed to block 106.

In block 106, the process 100 may determine if the set of recommended travel itineraries is sufficiently likely to be relevant to the traveler to include in the response 82. In an embodiment of the invention, the travel itineraries satisfying the search criteria that are stored in the cache may have been selected from a larger group of search results based on a statistical probabilistic profile. The statistical probabilistic profile may be a probabilistic profile configured to capture travel itineraries that are relevant to a selected cross-section of travelers. The travel itineraries that are selected for inclusion in the cache may thereby depend on the status of the statistical probabilistic profile at the time the cache was updated. Thus, whether the $N_R$ travel recommendations selected from the $M_R$ cached travel recommendations satisfying the search results are sufficient may depend on how similar the probabilistic profile of the traveler is to the statistical probabilistic profile at the time the cache was updated. The sufficiency of the recommended travel itineraries may also depend on whether travel recommendations that would be identified by the probabilistic profile of the traveler were added to the cache at all. That is, if the traveler has a probabilistic profile that is statistically independent from the statistical probabilistic profile, the travel recommendations stored in the cache may not include travel itineraries relevant to the traveler.

Whether the set of recommended travel itineraries is sufficient may be determined based on a distance d between the probabilistic profile of the traveler and the statistical probabilistic profile used to select travel itineraries in the cache. One way to determine the distance d may be to accumulate the weight $w_i$ of each value profile $VP_i$ in the probabilistic profile of the traveler that has a matching value profile in the statistical probabilistic profile used for the pre-computed search that populated the cache. That is:

$$d = 1 - \sum_{i=0}^{N} w_i \times F(VP_i)$$

where $F(VP_i)$ is a probabilistic function that returns logic value one (true) if the value profile $VP_i$ is included in the statistical probabilistic profile, and logic value zero (false) otherwise. The distance d may represent an accumulated weight of the value profiles $VP_i$ comprising the probabilistic profile of the traveler that have a matching value profile VPi in the statistical probabilistic profile. If there is a matching value profile in the statistical probabilistic profile for each value profile VPi having a non-zero weight $w_i$ in the probabilistic profile of the traveler, the distance d may be zero. A distance of zero may indicate a 100% probability that there is at least one travel itinerary in the set of M travel itineraries that matches the probabilistic profile of the traveler.

Once the distance d is determined, the process 100 may determine whether the set of recommended travel itineraries is sufficient by comparing the distance d to a threshold. This threshold may be absolute (e.g., d less than or equal to 70%). The threshold may also be set to a value that results in the set of recommended travel itineraries being found sufficient a certain percentage of the time, e.g., 80% of the time. If the set of recommended travel itineraries is sufficient ("YES" branch of decision block 106), the process 100 may proceed to block 122 and return the set of recommended travel itineraries. If the set of recommended travel itineraries is not sufficient ("NO" branch of decision block 106), the process 100 may proceed to block 124 and launch an online search for additional travel itineraries satisfying the search criteria. The online search may, for example, include transmitting queries to the carrier system 14 to obtain new search results, which the carrier system may determine by accessing one or more of the availability database 20, the itinerary database 21, and the fare database 22. The search results obtained online may then be filtered using the probabilistic profile of the traveler, and a portion of the online search results used to replace or enrich the set of recommended search results. For example, the online search results may be added to the set of travel itineraries satisfying the search criteria retrieved from the recommendations database 64 to generate a composite set of travel itineraries. The composite set of travel itineraries may then be filtered using the probabilistic profile of the traveler as described above to generate the set of recommended travel itineraries.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An apparatus for processing a first set of travel itineraries in a database to define a second set of recommended travel itineraries for a traveler, the apparatus comprising:
   one or more processors; and
   a memory coupled to the one or more processors, the memory storing data comprising program code that, when executed by the one or more processors, causes the apparatus to:
   for each value profile of a plurality of value profiles, determine an adjusted value of each travel itinerary in the first set of travel itineraries using the value profile;
   for each value profile, define a first set of near-optimal travel itineraries from the first set of travel itineraries based on the adjusted value of each travel itinerary;
   for each travel itinerary in the first set of travel itineraries, sum a weight of each value profile that includes the travel itinerary in the first set of near-optimal travel itineraries of the value profile to generate a first sum;
   compare the first sums to determine the first sum having a highest value; and
   add the travel itinerary having the first sum with the highest value to the second set of travel itineraries.

2. The apparatus of claim 1 wherein the program code is further configured to cause the apparatus to:
   reduce the weight of each value profile that contributed to the first sum with the highest value;
   for each travel itinerary in the first set of travel itineraries that has not been added to the second set of travel itineraries, sum the weight of each value profile that includes the travel itinerary in the first set of near-optimal travel itineraries of the value profile to generate a second sum;
   compare the second sums to determine the second sum with the highest value; and
   add the travel itinerary having the second sum with the highest value to the second set of travel itineraries.

3. The apparatus of claim 1 wherein reducing the weight of each value profile comprises setting the weight to zero.

4. The apparatus of claim 1 wherein defining the first set of near-optimal travel itineraries comprises, for each value profile:
   for each travel itinerary in the first set of travel itineraries, determining a convenience value of the travel itinerary using the value profile;
   for each travel itinerary in the first set of travel itineraries, determining a monetary value of the travel itinerary;
   for each travel itinerary in the first set of travel itineraries, adding the convenience value and the monetary value to determine the adjusted value of the travel itinerary;
   identifying the travel itinerary in the first set of travel itineraries having a lowest adjusted value as an optimal travel itinerary; and
   selecting the optimal travel itinerary and each travel itinerary having the adjusted value within a first predetermined amount of the adjusted value of the optimal travel itinerary for inclusion in the first set of near-optimal travel itineraries.

5. The apparatus of claim 4 wherein the program code is further configured to cause the apparatus to:
   for each value profile, define a second set of near-optimal travel itineraries to include the optimal travel itinerary and each travel itinerary having the adjusted value within a second predetermined amount of the adjusted value of the optimal travel itinerary, wherein the second predetermined amount is higher than the first predetermined amount.

6. The apparatus of claim 5 wherein the program code is further configured to cause the apparatus to:
   for each travel itinerary in the first set of travel itineraries that has not been added to the second set of travel itineraries, sum the weight of each value profile that includes the travel itinerary in the second set of near-optimal travel itineraries to generate a second sum;
   compare the second sums to determine the second sum with the highest value; and
   add the travel itinerary having the second sum with the highest value to the second set of travel itineraries.

7. The apparatus of claim 5 wherein the program code is further configured to cause the apparatus to:
   for each value profile, determine a number of travel itineraries in the second set of near-optimal travel itineraries that are included in the second set of travel itineraries;
   for each value profile wherein the number of travel itineraries exceeds a threshold, reduce the weight of the value profile;
   for each travel itinerary in the first set of travel itineraries that has not been added to the second set of travel itineraries, sum the weight of each value profile that includes the travel itinerary in the second set of near-optimal travel itineraries of the value profile to generate a second sum;
   compare the second sums to determine the second sum with the highest value; and
   add the travel itinerary having the second sum with the highest value to the second set of travel itineraries.

8. The apparatus of claim 5 wherein the plurality of value profiles comprises a probabilistic profile, and the program code is further configured to cause the apparatus to:
  determine whether the probabilistic profile is exhaustive or non-exhaustive, wherein the second set of near-optimal travel itineraries is defined in response to a determination that the probabilistic profile is non-exhaustive.

9. The apparatus of claim 1 wherein the travel itineraries in the first set of travel itineraries comprise first search results based on a first probabilistic profile, the traveler is associated with a second probabilistic profile, and the program code is further configured to cause the apparatus to:
  determine a distance between the first probabilistic profile and the second probabilistic profile;
  in response to the distance being greater than a threshold, launch an online search for additional travel itineraries based on the second probabilistic profile; and
  enrich the first set of travel itineraries with at least a portion of the additional travel itineraries returned by the online search.

10. The apparatus of claim 1 wherein each value profile of the plurality of value profiles includes a coefficient corresponding to a characteristic of each travel itinerary in the first set of travel itineraries.

11. A method of processing a first set of travel itineraries in a database to define a second set of recommended travel itineraries for a traveler, the method comprising:
  for each value profile of a plurality of value profiles, determining, by a computer, an adjusted value of each travel itinerary in the first set of travel itineraries using the value profile;
  for each value profile, defining, by the computer, a first set of near-optimal travel itineraries from the first set of travel itineraries based on the adjusted value of each travel itinerary;
  for each travel itinerary in the first set of travel itineraries, summing, by the computer, a weight of each value profile that includes the travel itinerary in the first set of near-optimal travel itineraries of the value profile to generate a first sum;
  comparing the first sums to determine the first sum with a highest value; and
  adding, by the computer, the travel itinerary having the first sum with the highest value to the second set of travel itineraries.

12. The method of claim 11 further comprising:
  reducing the weight of each value profile that contributed to the first sum with the highest value;
  for each travel itinerary in the first set of travel itineraries that has not been added to the second set of travel itineraries, summing the weight of each value profile that includes the travel itinerary in the first set of near-optimal travel itineraries of the value profile to generate a second sum;
  compare the second sums to determine the second sum with the highest value; and
  adding the travel itinerary having the second sum with the highest value to the second set of travel itineraries.

13. The method of claim 12 wherein reducing the weight of each value profile comprises setting the weight to zero.

14. The method of claim 12 wherein each value profile of the plurality of value profiles includes a coefficient corresponding to a characteristic of each travel itinerary in the first set of travel itineraries.

15. The method of claim 11 wherein defining the first set of near-optimal travel itineraries comprises, for each value profile:
  for each travel itinerary in the first set of travel itineraries, determining a convenience value of the travel itinerary using the value profile;
  for each travel itinerary in the first set of travel itineraries, determining a monetary value of the travel itinerary;
  for each travel itinerary in the first set of travel itineraries, adding the convenience value and the monetary value to determine the adjusted value of the travel itinerary;
  identifying the travel itinerary in the first set of travel itineraries having a lowest adjusted value as an optimal travel itinerary; and
  selecting the optimal travel itinerary and each travel itinerary having the adjusted value within a first predetermined amount of the adjusted value of the optimal travel itinerary for inclusion in the first set of near-optimal travel itineraries.

16. The method of claim 15 further comprising:
  for each value profile, defining a second set of near-optimal travel itineraries to include the optimal travel itinerary and each travel itinerary having the adjusted value within a second predetermined amount of the adjusted value of the optimal travel itinerary, wherein the second predetermined amount is higher than the first predetermined amount.

17. The method of claim 16 further comprising:
  for each travel itinerary in the first set of travel itineraries that has not been added to the second set of travel itineraries, summing the weight of each value profile that includes the travel itinerary in the second set of near-optimal travel itineraries to generate a second sum;
  compare the second sums to determine the second sum with the highest value; and
  adding the travel itinerary having the second sum with the highest value to the first set of travel itineraries.

18. The method of claim 16 further comprising:
  for each value profile, determining a number of travel itineraries in the second set of near-optimal travel itineraries that are included in the second set of travel itineraries;
  for each value profile wherein the number of travel itineraries exceeds a threshold, reducing the weight of the value profile;
  for each travel itinerary in the second set of travel itineraries that has not been added to the first set of travel itineraries, summing the weight of each value profile that includes the travel itinerary in the second set of near-optimal travel itineraries of the value profile to generate a second sum;
  compare the second sums to determine the second sum with the highest value; and
  adding the travel itinerary having the second sum with the highest value to the first set of travel itineraries.

19. The method of claim 16 wherein the plurality of value profiles comprises a probabilistic profile, and further comprising:
  determining whether the probabilistic profile is exhaustive or non-exhaustive, wherein the second set of near-optimal travel itineraries is defined in response to a determination that the probabilistic profile is non-exhaustive.

20. The method of claim 11 wherein the travel itineraries in the first set of travel itineraries comprise first search results based on a first probabilistic profile, the traveler is associated with a second probabilistic profile, and further comprising:
  determining a distance between the first probabilistic profile and the second probabilistic profile;
  in response to the distance being greater than a threshold, launching an online search for additional travel itineraries based on the second probabilistic profile; and
  enriching the first set of travel itineraries with at least a portion of the additional travel itineraries returned by the online search.

21. The method of claim 20 wherein enriching the first set of travel itineraries comprises:
  adding the additional travel itineraries to the first set of travel itineraries to generate a composite set of travel itineraries;
  for each value profile, defining a second set of near-optimal travel itineraries from the composite set of travel itineraries;
  for each travel itinerary in the composite set of travel itineraries, summing the weight of each value profile that includes the travel itinerary in the second set of near-optimal travel itineraries of the value profile to generate a second sum;
  compare the second sums to determine the second sum with the highest value; and
  adding the travel itinerary having the second sum with the highest value to the first set of travel itineraries.

22. A computer program product for processing a first set of travel itineraries in a database to define a second set of recommended travel itineraries for a traveler, the computer program product comprising:
  a non-transitory computer-readable storage medium; and
  program code stored on the non-transitory computer-readable storage medium that, when executed by one or more processors, causes the one or more processors to:
  for each value profile of a plurality of value profiles, determine an adjusted value of each travel itinerary in the first set of travel itineraries using the value profile;
  for each value profile, define a first set of near-optimal travel itineraries from the first set of travel itineraries based on the adjusted value of each travel itinerary;
  for each travel itinerary in the first set of travel itineraries, sum a weight of each value profile that includes the travel itinerary in the first set of near-optimal travel itineraries of the value profile to generate a first sum;
  compare the first sums to determine the first sum with the highest value; and
  add the travel itinerary having the first sum with the highest value to the second set of travel itineraries.

\* \* \* \* \*